United States Patent
Yoshida et al.

(10) Patent No.: US 8,156,731 B2
(45) Date of Patent: Apr. 17, 2012

(54) EXHAUST PURIFICATION DEVICE OF INTERNAL COMBUSTION ENGINE

(75) Inventors: Kohei Yoshida, Gotenba (JP); Shinya Hirota, Susono (JP); Takamitsu Asanuma, Mishima (JP); Hiromasa Nishioka, Susono (JP); Hiroshi Otsuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 650 days.

(21) Appl. No.: 12/227,876

(22) PCT Filed: Apr. 3, 2008

(86) PCT No.: PCT/JP2008/057042
§ 371 (c)(1),
(2), (4) Date: Dec. 1, 2008

(87) PCT Pub. No.: WO2008/123628
PCT Pub. Date: Oct. 16, 2008

(65) Prior Publication Data
US 2009/0145113 A1    Jun. 11, 2009

(30) Foreign Application Priority Data
Apr. 3, 2007 (JP) .................................. 2007-097044

(51) Int. Cl.
*F01N 3/00* (2006.01)
(52) U.S. Cl. ............... 60/285; 60/274; 60/286; 60/295; 60/301
(58) Field of Classification Search .................... 60/274, 60/284–287, 295–301
See application file for complete search history.

(56) References Cited

U.S. PATENT DOCUMENTS

| | | | | |
|---|---|---|---|---|
| 6,482,377 | B2* | 11/2002 | Bartley et al. | 423/213.2 |
| 6,860,101 | B2* | 3/2005 | Kako et al. | 60/285 |
| 6,925,797 | B2* | 8/2005 | Taga et al. | 60/301 |
| 6,938,411 | B2* | 9/2005 | Hoffmann et al. | 60/295 |
| 7,051,520 | B2* | 5/2006 | Nagaoka et al. | 60/297 |
| 2001/0035006 | A1* | 11/2001 | Dou et al. | 60/274 |
| 2003/0159435 | A1* | 8/2003 | Berris et al. | 60/295 |
| 2005/0060987 | A1* | 3/2005 | Nakano et al. | 60/285 |

(Continued)

FOREIGN PATENT DOCUMENTS
EP     1 365 117 A2    11/2003
(Continued)

OTHER PUBLICATIONS

European Search Report issued in Application No. EP 08 74 0145; dated Sep. 24, 2010.

*Primary Examiner* — Thomas Denion
*Assistant Examiner* — Jesse Bogue
(74) *Attorney, Agent, or Firm* — Oliff & Berridge, PLC

(57) ABSTRACT

An internal combustion engine in which a front end catalyst (12) and rear end catalyst (14) comprising $NO_x$ storing catalysts are arranged in an engine exhaust passage. When these catalysts (12, 14) should recover from $SO_x$ poisoning, $SO_x$ poisoning recovery proceeding is performed in which the temperatures of the corresponding catalysts (12, 14) are raised to the $SO_x$ release temperature and the air-fuel ratio of the exhaust gas flowing into the corresponding catalysts (12, 14) is made rich. In this case, the frequency of performing the $SO_x$ poisoning recovery proceeding of the rear end catalyst (14) is made higher than the frequency of performing the $SO_x$ poisoning recovery proceeding of the front end catalyst (12).

6 Claims, 5 Drawing Sheets

U.S. PATENT DOCUMENTS

| | | |
|---|---|---|
| 2006/0064969 A1* | 3/2006 | Yoshida et al. ............ 60/286 |
| 2006/0144632 A1 | 7/2006 | Ranalli et al. |
| 2006/0168948 A1 | 8/2006 | Xu et al. |

FOREIGN PATENT DOCUMENTS

| | | |
|---|---|---|
| EP | 1 519 015 A2 | 3/2005 |
| EP | 1 698 766 A1 | 9/2006 |
| JP | A-11-153021 | 6/1999 |
| JP | A-2000-303825 | 10/2000 |
| JP | A-2005-133610 | 5/2005 |
| JP | A-2006-138213 | 6/2006 |
| JP | A-2006-242124 | 9/2006 |
| JP | A-2006-305524 | 11/2006 |

* cited by examiner

US 8,156,731 B2

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine having arranged in an engine exhaust passage an $NO_x$ storing catalyst which stores $NO_x$ contained in exhaust gas when the air-fuel ratio of the inflowing exhaust gas is lean and releases the stored $NO_x$ when the air-fuel ratio of the inflowing exhaust gas becomes the stoichiometric air-fuel ratio or rich. In this internal combustion engine, the $NO_x$ produced when burning fuel under a lean air-fuel ratio is stored in the $NO_x$ storing catalyst. On the other hand, when the $NO_x$ storing capability of the $NO_x$ storing catalyst approaches saturation, the air-fuel ratio of the exhaust gas is temporarily made rich and thereby the $NO_x$ is released from the $NO_x$ storing catalyst and reduced.

However, the fuel contains sulfur. Therefore, the exhaust gas contains $SO_x$. This $SO_x$ is stored in the $NO_x$ storing catalyst along with the $NO_x$. However, this $SO_x$ is not released from the $NO_x$ storing catalyst just by making the air-fuel ratio of the exhaust gas rich. Therefore, the amount of $SO_x$ stored in the $NO_x$ storing catalyst gradually increases. As a result, the amount of $NO_x$ which can be stored ends up gradually decreasing.

Known in the art therefore is an internal combustion engine having an $SO_x$ trap catalyst arranged in the engine exhaust passage upstream of the $NO_x$ storing catalyst so as to prevent $SO_x$ from being sent to the $NO_x$ storing catalyst (see Japanese Unexamined Patent Publication (Kokai) No. 2005-133610). In this internal combustion engine, the $SO_x$ contained in the exhaust gas is trapped by the $SO_x$ trap catalyst. Therefore, the $SO_x$ is prevented from flowing into the $NO_x$ storing catalyst. As a result, the storing capability of the $NO_x$ can be prevented from dropping due to storage of $SO_x$.

In this regard, so long as this $SO_x$ trap catalyst is working under its predetermined use, it will continue to trap the $SO_x$ contained in the exhaust gas within a predetermined guaranteed driving distance. However, for example, should the vehicle be driven when the user mistakenly use fuel containing a high concentration of sulfur or when the predetermined guaranteed driving distance is exceeded, there is a problem that over the allowable amount of $SO_x$ will be sent to the $SO_x$ trap catalyst and therefore the $SO_x$ trap catalyst will no longer be able to trap $SO_x$.

Considering this problem, when a large amount of $SO_x$ is trapped in the $SO_x$ trap catalyst, it becomes necessary to make the $SO_x$ trap catalyst release $SO_x$ to restore the $SO_x$ trapping capability of the $SO_x$ trap catalyst.

DISCLOSURE OF THE INVENTION

An object of the present invention is to provide an exhaust purification device of an internal combustion engine capable of efficiently restoring the trapping capability of $SO_x$ or the storing capability of $SO_x$.

According to the present invention, there is provided an exhaust purification device of an internal combustion engine wherein a front end catalyst and rear end catalyst are arranged in this sequence in an engine exhaust passage along an exhaust gas flow; the front end catalyst and the rear end catalyst are comprised of $NO_x$ storing catalysts storing $NO_x$ contained in the exhaust gas when an air-fuel ratio of inflowing exhaust gas is lean and releasing stored $NO_x$ when the air-fuel ratio of the inflowing exhaust gas becomes stoichiometric or rich; when the front end catalyst should recover from $SO_x$ poisoning, $SO_x$ poisoning recovery proceeding is performed by raising a temperature of the front end catalyst to a $SO_x$ release temperature and making the air-fuel ratio of the exhaust gas flowing into the front end catalyst rich, and when the rear end catalyst should recover from $SO_x$ poisoning, $SO_x$ poisoning recovery proceeding is performed by raising a temperature of the rear end catalyst to the $SO_x$ release temperature and making the air-fuel ratio of the exhaust gas flowing into the rear end catalyst rich; and a frequency of performing the $SO_x$ poisoning recovery proceeding for the rear end catalyst is made higher than a frequency of performing the $SO_x$ poisoning recovery proceeding for the front end catalyst.

That is, the degree of the heat deterioration of the rear end catalyst is lower in comparison to the front end catalyst, so it is easier for the rear end catalyst to recover from $SO_x$ poisoning. Accordingly, by increasing the frequency of the $SO_x$ poisoning recovery proceeding of the rear end catalyst, the $NO_x$ purification rate can be increased.

BEST MODE FOR CARRYING OUT THE INVENTION

Figure 1:
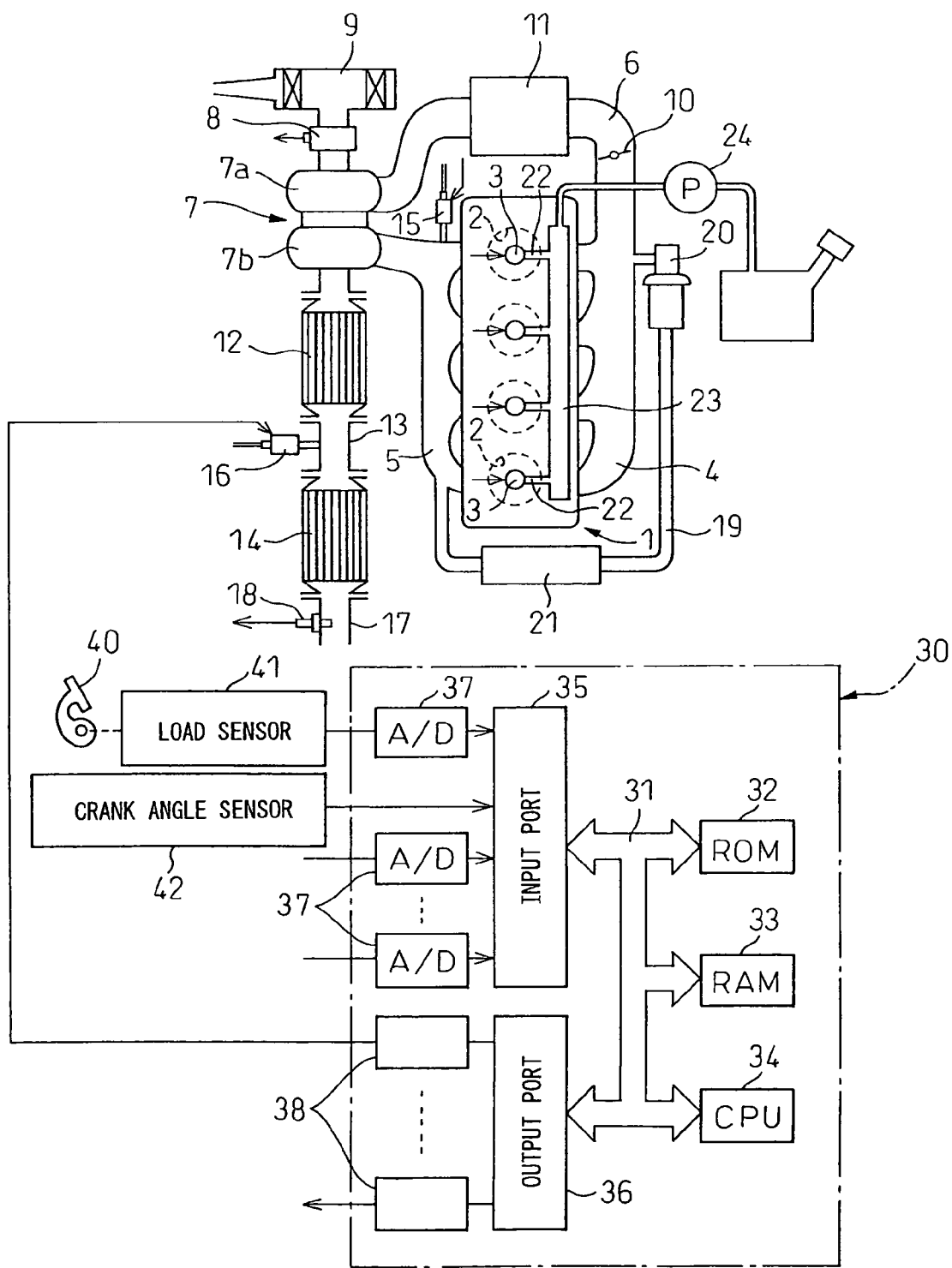
FIG. 1 is an overall view of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected to an air cleaner 9 via an intake air amount detector 8. Inside the intake duct 6 is arranged a throttle valve 10 driven by a step motor. Further, around the intake duct 6 is arranged a cooling device (intercooler) 11 for cooling the intake air flowing through the inside of the intake duct 6. In the embodiment shown in FIG. 1, the engine cooling water is guided into the cooling device 11. The engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of a front end catalyst 12. Further, the outlet of the front end catalyst 12 is connected to the inlet of a rear end catalyst 14 via an exhaust pipe 13. A reducing agent supply valve 15 for the front end catalyst for supplying a reducing agent comprised of for example hydrocarbons into the exhaust gas flowing into the front end catalyst 12 is arranged in the exhaust manifold 5, and a reducing agent supply valve 16 for the rear end catalyst for supplying a reducing agent comprised of for example hydrocarbons into the exhaust gas flowing into the rear end catalyst 14 is arranged in the exhaust pipe 13. In addition, an $NO_x$ sensor 18 is arranged in an exhaust pipe 17 which is connected to the outlet of the rear end catalyst 14.

The exhaust manifold 5 and the intake manifold 4 are interconnected through an exhaust gas recirculation (hereinafter referred to as an "EGR") passage 19. The EGR passage 19 is provided with an electronically controlled EGR control valve 20. Further, around the EGR passage 19 is arranged a cooling device 21 for cooling the EGR gas flowing through the inside of the EGR passage 19. In the embodiment shown in FIG. 1, the engine cooling water is guided into the cooling device 21. The engine cooling water cools the EGR gas. On the other hand, each fuel injector 3 is connected through a fuel feed tube 22 to a common rail 23. This common rail 23 is supplied with fuel from an electronically controlled variable discharge fuel pump 24. The fuel supplied into the common rail 23 is supplied through each fuel feed tube 22 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The output signals of the intake air amount detector 8 and the $NO_x$ sensor 18 are input through corresponding AD converters 37 to the input port 35. An accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, step motor for driving the throttle valve 10, reducing agent supply valve 15 for the front end catalyst, reducing agent supply valve 16 for the rear end catalyst, EGR control valve 20, and fuel pump 24.

Figure 2:
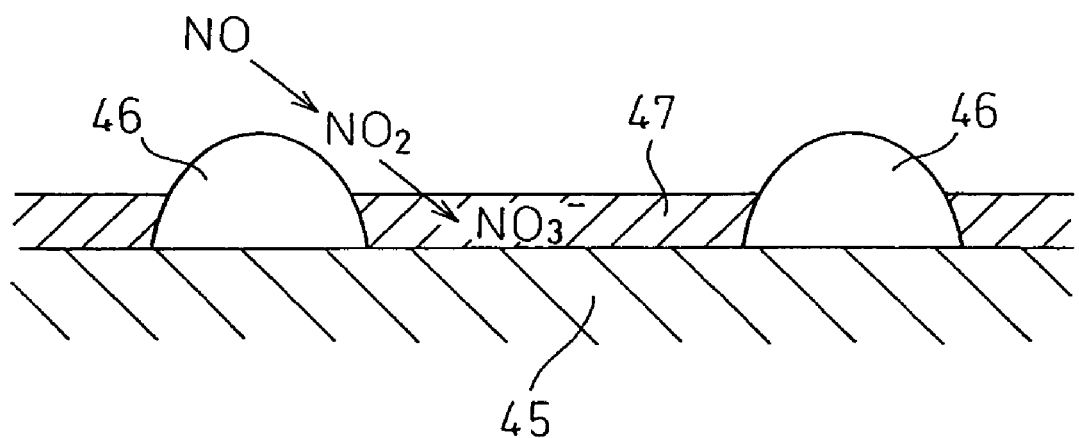
FIG. 2 is a cross-sectional view of a surface part of a catalyst carrier of an $NO_x$ storing catalyst.

Both the front end catalyst 12 and the rear end catalyst 14, which are shown in FIG. 1, are comprised of a $NO_x$ storing catalyst, and therefore, first, the $NO_x$ storing catalyst will be explained. In this $NO_x$ storing catalyst, a catalyst carrier comprised of for example alumina is carried on the substrate of the $NO_x$ storing catalyst, and FIG. 2 schematically illustrates the cross-section of the surface part of this catalyst carrier 45. As shown in FIG. 2, precious metal catalysts 46 are diffused and carried on the surface part of the catalyst carrier 45. Further, a layer of a $NO_x$ absorbent 47 is formed on the surface part of the catalyst carrier 45.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the catalysts 12, 14 is referred to as the "air-fuel ratio of the exhaust gas", the $NO_x$ absorbent 47 performs an $NO_x$ absorption and release action of storing the $NO_x$ when the air-fuel ratio of the exhaust gas is lean and releasing the stored $NO_x$ when the oxygen concentration in the exhaust gas falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, the NO contained in the exhaust gas is oxidized on the platinum Pt 46 such as shown in FIG. 2 to become $NO_2$, then is absorbed in the $NO_x$ absorbent 47 and diffuses in the $NO_x$ absorbent 47 in the form of nitric acid ions $NO_3^-$ while bonding with the barium oxide BaO. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorbing capability of the $NO_x$ absorbent 47 is not saturated, the $NO_2$ is absorbed in the $NO_x$ absorbent 47 and nitric acid ions $NO_3^-$ are produced.

As opposed to this, by supplying a reducing agent from the reducing agent supply valve 15, 16 to make the air-fuel ratio of the exhaust gas rich or the stoichiometric air-fuel ratio, since the oxygen concentration in the exhaust gas falls, the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$. Next, the released $NO_x$ is reduced by the unburned hydrocarbons or CO included in the exhaust gas.

In this way, when the air-fuel ratio of the exhaust gas is lean, that is, when burning fuel under a lean air-fuel ratio, the $NO_x$ in the exhaust gas is absorbed in the $NO_x$ absorbent 47. However, if continuing to burn fuel under a lean air-fuel ratio, during that time the $NO_x$ absorbing capability of the $NO_x$ absorbent 47 will end up becoming saturated and therefore $NO_x$ will end up no longer being able to be absorbed by the $NO_x$ absorbent 47. Therefore, in this embodiment according to the present invention, before the absorbing capability of the $NO_x$ absorbent 47 becomes saturated, a reducing agent is supplied from the reducing agent supply valve 15, 16 so as to temporarily make the air-fuel ratio of the exhaust gas rich and thereby release the $NO_x$ from the $NO_x$ absorbent 47.

However, exhaust gas contains $SO_x$, that is, $SO_2$. When this $SO_2$ flows into the $NO_x$ storing catalyst, this $SO_2$ is oxidized at the platinum Pt 46 and becomes $SO_3$. Next, this $SO_3$ is absorbed in the $NO_x$ absorbent 47 and bonds with the barium oxide BaO while diffusing in the $NO_x$ absorbent 47 in the form of sulfate ions $SO_4^{2-}$ to produce the stable sulfate $BaSO_4$. However, the $NO_x$ absorbent 47 has a strong basicity, so this sulfate $BaSO_4$ is stable and hard to decompose. If just making the air-fuel ratio of the exhaust gas rich, the sulfate $BaSO_4$ will remain without being decomposed. Therefore, in the $NO_x$ absorbent 47, the sulfate $BaSO_4$ will increase along with the elapse of time and therefore the amount of $NO_x$ which the $NO_x$ absorbent 47 can absorb will fall along with the elapse of time. Namely, the $NO_x$ storing catalyst is poisoned by $SO_x$.

In this regard, if making the air-fuel ratio of the exhaust gas flowing into the $NO_x$ storing catalyst rich in the state raising the temperature of the $NO_x$ storing catalyst to the $SO_x$ release temperature of 600° C. or higher, $SO_x$ will be released from the $NO_x$ absorbent 47, thereby allowing the $NO_x$ storing catalyst to recover from $SO_x$ poisoning. Then, in the embodiment of the present invention, when the front end catalyst 12 should recover from $SO_x$ poisoning, the temperature of the front end catalyst 12 is raised to the $SO_x$ release temperature, and the air-fuel ratio of the exhaust gas flowing into the front end catalyst 12 is made rich. In addition, when the rear end catalyst 14 should recover from $SO_x$ poisoning, the temperature of the rear end catalyst 14 is raised to the $SO_x$ release temperature, and the air-fuel ratio of the exhaust gas flowing into the rear end catalyst is made rich.

In this case, in the embodiment of the present invention, fuel is supplied from the corresponding reducing agent supply valves 15, 16 to raise the temperature of catalysts 12, 14 to the $SO_x$ release temperature and to make the air-fuel ratio of the exhaust gas flowing into the catalysts 12, 14 rich. That is, when the front end catalyst 12 performs processing to recover from $SO_x$ poisoning, the reducing agent supply valve 15 for the front end catalyst supplies the reducing agent, and when the rear end catalyst 14 performs processing to recover from $SO_x$ poisoning, the reducing agent supply valve 16 for the rear end catalyst supplies the reducing agent.

Further, in the embodiment of the present invention, $SO_x$ poisoning recovery proceeding to recover from this $SO_x$ poisoning is performed for each catalyst 12, 14. Specifically, in the embodiment of the present invention, when the $NO_x$ purification rate by both the catalysts of the front end catalyst 12 and rear end catalyst 14 becomes a predetermined allowable level or less, either of the $SO_x$ poisoning recovery proceeding for the front end catalyst 12 or the $SO_x$ poisoning recovery proceeding for the rear end catalyst 14 is performed. In this case, the $NO_x$ purification rate is calculated from the $NO_x$ concentration detected by the $NO_x$ sensor 18.

That is, the fuel contains a certain ratio of sulfur, accordingly the amount of $SO_x$ contained in the exhaust gas is proportional to the amount of fuel injected. The amount of fuel injected is a function of the required torque and the engine speed, accordingly the amount of $SO_x$ contained in the exhaust gas is also a function of the required torque and the engine speed. In the embodiment of the present invention, the $SO_x$ amount SOXA exhausted from the combustion chamber 2 per unit time is stored as a function of the required torque TQ and the engine speed N in the form of the map shown in FIG. 3 in advance in the ROM 32. Further, the amount of $NO_x$ contained in the exhaust gas is also a function of the required torque and the engine speed, and the $NO_x$ amount exhausted from the combustion chamber 2 per unit time is also stored as a function of the required torque TQ and the engine speed N in the form of a map in advance in the ROM 32. On the other hand, the amount of exhaust gas exhausted from the combustion chamber 2 per unit time is determined from the amount of intake air, accordingly the $NO_x$ concentration of the exhaust gas flowing into the front end catalyst 12 can be calculated from the stored $NO_x$ amount exhausted per unit time and the amount of intake air. The $NO_x$ purification rate can be calculated from this $NO_x$ concentration and the $NO_x$ concentration detected by the $NO_x$ sensor 18.

Now, when comparing the front end catalyst 12 and the rear end catalyst 14, the front end catalyst 12 will have a higher temperature than the rear end catalyst 14, thereby the front end catalyst 12 will deteriorate by heat more than the rear end catalyst 14. In this regard, when there is heat deterioration, $SO_x$ poisoning is not sufficiently recovered from even when the reducing agent is supplied. As opposed to this, when there is no heat deterioration, $SO_x$ poisoning is sufficiently recovered from using the same amount of the reducing agent. Accordingly, recovery from $SO_x$ poisoning of the rear end catalyst 14 resistant to heat deterioration better increases the $NO_x$ purification rate and enables the amount of consumption of the reducing agent, that is, the fuel, to be kept lower. Therefore, in the present invention, the $SO_x$ poisoning of the rear end catalyst 14 is recovered from preferentially. Next, this will be explained with reference to FIG. 4.

Figure 4:
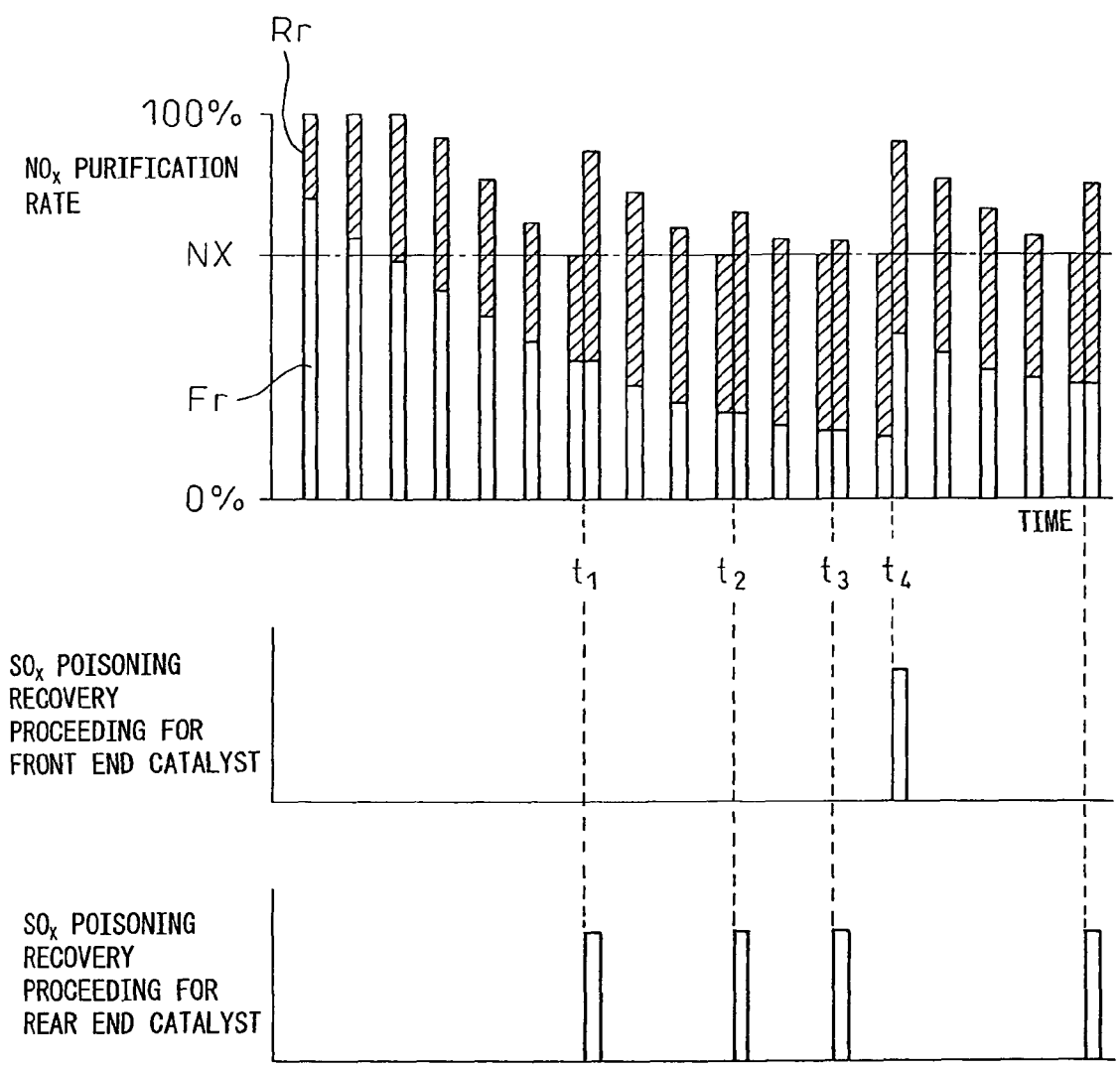
FIG. 4 is a time chart showing the changes in the $NO_x$ purification rate and the timing of the $SO_x$ poisoning recovery proceeding.

FIG. 4 shows the changes of the $NO_x$ purification rate accompanying the elapse of time and the timing of the $SO_x$ poisoning recovery proceeding for the front end catalyst 12 and the rear end catalyst 14. Note that, in FIG. 4, the white region Fr shows the part of the contribution of the front end catalyst 12 to the $NO_x$ purification rate, and the shaded region Rr shows the part of contribution of the rear end catalyst 14 to the $NO_x$ purification rate. Further, in FIG. 4, NX shows the allowable level of the $NO_x$ purification rate.

As will be understood from FIG. 4, initially the $NO_x$ purification rate is maintained at 100 percent. At this time, the $SO_x$ poisoning begins from the front end catalyst 12 positioned at the upstream side, so the $NO_x$ purification rate of the front end catalyst 12 drops gradually. On the other hand, even if the $NO_x$ purification rate of the front end catalyst 12 drops, the $NO_x$ purification will be covered by the rear end catalyst 14, so the $NO_x$ purification rate will be maintained at 100 percent for a while. Next, $SO_x$ poisoning in the rear end catalyst 14 advances, so the $NO_x$ purification rate will drop gradually.

Next, at the time $t_1$, when the $NO_x$ purification rate becomes lower than the allowable level NX, $SO_x$ poisoning recovery proceeding will be performed in the rear end catalyst 14. As a result, the $NO_x$ purification rate by the rear end catalyst 14 will rise and therefore the $NO_x$ purification rate by the two catalysts 12, 14 will rise. Next, at the time $t_2$, when the $NO_x$ purification rate becomes lower than the allowable level NX, $SO_x$ poisoning recovery proceeding will be performed once again in the rear end catalyst 14, and the $NO_x$ purification rate of the rear end catalyst 14 will rise. Next, at the time $t_3$, when the $NO_x$ purification rate is lower than the allowable level NX, $SO_x$ poisoning recovery proceeding will be performed once again in the rear end catalyst 14, and the $NO_x$ purification rate by the rear end catalyst 14 will be raised.

Next, at the time $t_4$, when the $NO_x$ purification rate once again becomes the allowable level NX or lower, the $NO_x$ purification rate will not rise much at all even if performing $SO_x$ poisoning recovery proceeding of the rear end catalyst 14. Accordingly, when this occurs, as shown in FIG. 4, $SO_x$ poisoning recovery proceeding will be performed in the front end catalyst 12 and thereby the $NO_x$ purification rate by both the catalysts 12, 14 will be raised. Note that $SO_x$ poisoning recovery proceeding may be performed in the rear end catalyst 14 simultaneously at this time.

In this way, in the present invention, as long as the $NO_x$ purification rate can be made to recover to the target $NO_x$ purification rate, the $SO_x$ poisoning recovery proceeding of the rear end catalyst 14 is repeated. When the $NO_x$ purification rate cannot be made to recover to the target $NO_x$ purification rate even with the $SO_x$ poisoning recovery proceeding of the rear end catalyst 14, the $SO_x$ poisoning recovery proceeding is performed in the front end catalyst 12. Accordingly, in the present invention, as can be seen in FIG. 4, the frequency of the $SO_x$ poisoning recovery proceeding of the rear end catalyst 14 is greater than the frequency of the $SO_x$ poisoning recovery proceeding of the front end catalyst 12.

Note that, as will be understood from FIG. 4, the intervals of $SO_x$ poisoning recovery proceeding of the rear end catalyst 14 gradually become shorter. Accordingly, from a different viewpoint, in the present invention, when the interval for the $SO_x$ poisoning recovery proceeding of the rear end catalyst 14 becomes shorter than a predetermined period, the $SO_x$ poisoning recovery proceeding is performed in the front end catalyst 12.

Figure 5:
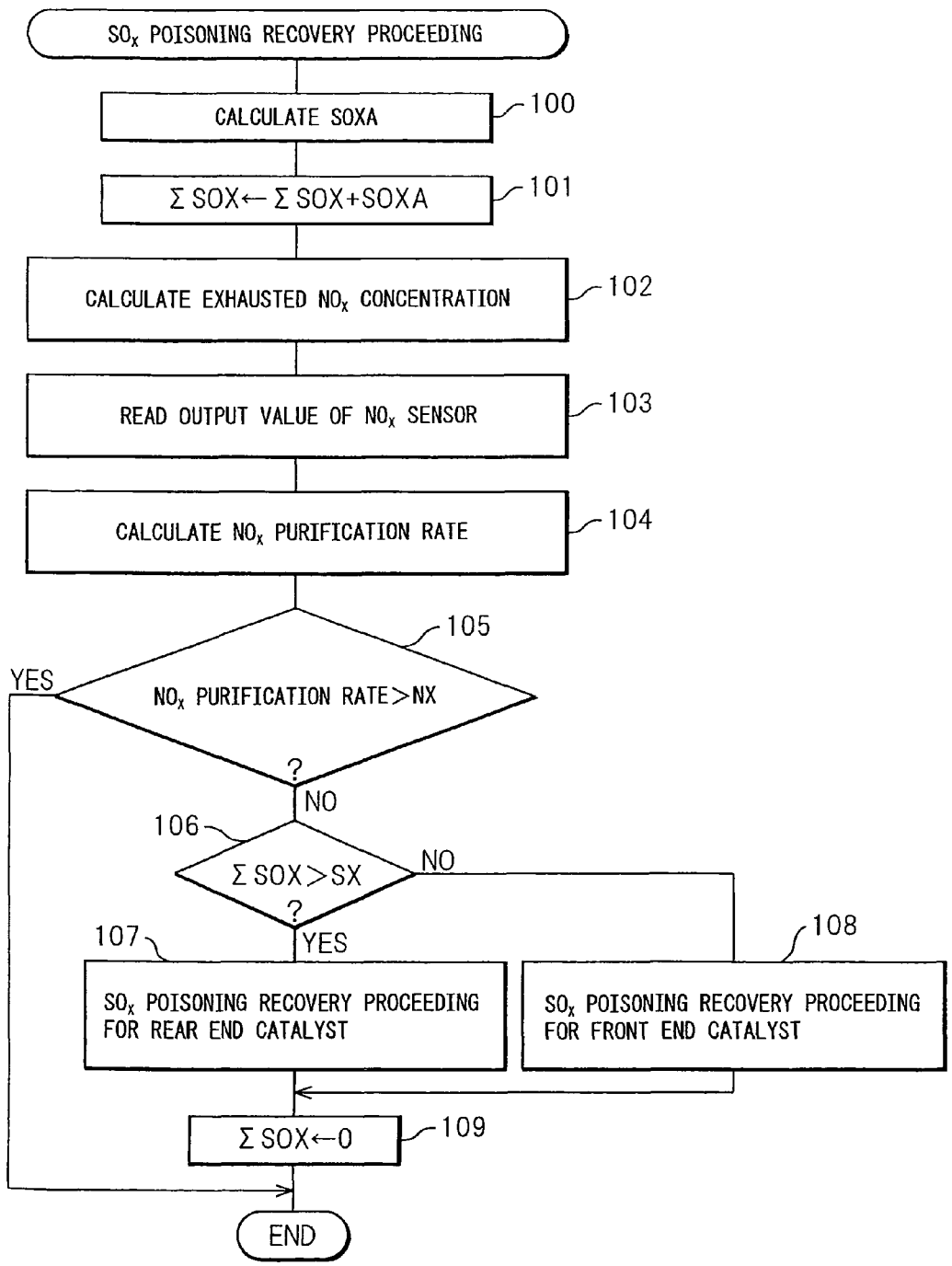
FIG. 5 is a flow chart for carrying out the $SO_x$ poisoning recovery proceeding.

FIG. 5 shows the routine for carrying out $SO_x$ poisoning recovery proceeding.

Figure 3:
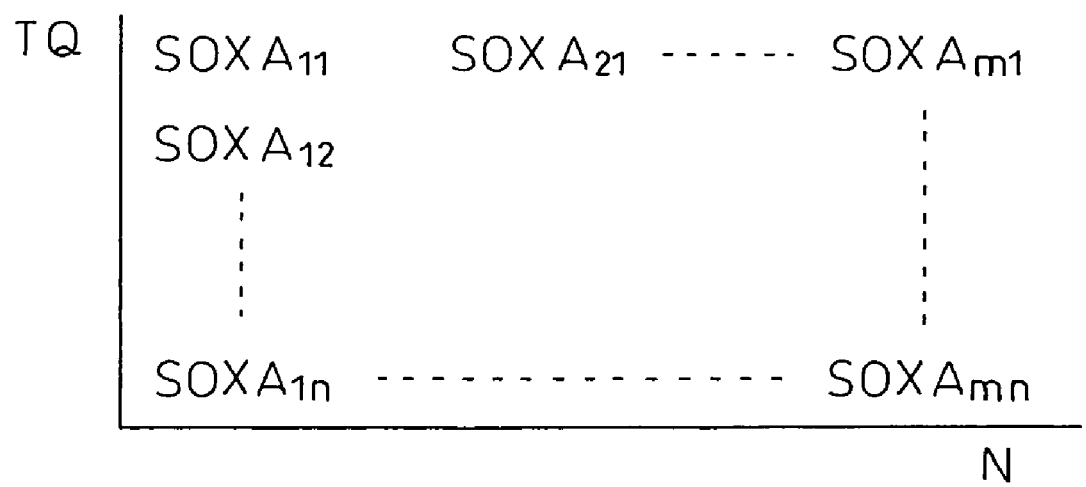
FIG. 3 is a view showing a map of the exhausted $SO_x$ amount SOXA.

Referring to FIG. 5, first, at step 100, the exhausted $SO_x$ amount SOXA is calculated from FIG. 3. Then, at step 101, this exhausted $SO_x$ amount SOXA is added to the $\Sigma SOX$ to calculate the cumulative value $\Sigma SOX$ of the exhausted $SO_x$ amount. Then, at step 102, the exhausted $NO_x$ concentration is calculated from the exhausted $NO_x$ amount and the intake air amount. Then, at step 103, the output value of the $NO_x$ sensor 18 is read, and at step 104, the $NO_x$ purification rate is calculated from the $NO_x$ sensor 18 output value and the exhausted $NO_x$ concentration.

Next, at step 105, it is judged if the $NO_x$ purification rate is higher than the allowable level NX. If the $NO_x$ purification rate falls below the allowable level NX, the routine proceeds to step 106, where it is judged if the cumulative value $\Sigma$SOX of the exhausted $SO_x$ amount, which is calculated from immediately after the $SO_x$ poisoning recovery proceeding, is greater than the set value SX. When $\Sigma$SOX>SX, that is, when a large amount of $SO_x$ has been stored after the $SO_x$ poisoning recovery proceeding, it is judged that the $NO_x$ purification rate of the rear end catalyst 14 can be sufficiently recovered. At this time, the routine proceeds to step 107, wherein the $SO_x$ poisoning recovery proceeding of the rear end catalyst 14 is performed. Then, the routine proceeds to step 109 where the $\Sigma$SOX is cleared. In contrast, when $\Sigma$SOX$\leq$SX, that is, when it is judged that the $NO_x$ purification rate of the rear end catalyst 14 cannot be sufficiently recovered, the routine proceeds to step 108, where the $SO_x$ poisoning recovery proceeding of the front end catalyst 12 is performed. Then, the routine proceeds to step 109.

Figure 6:
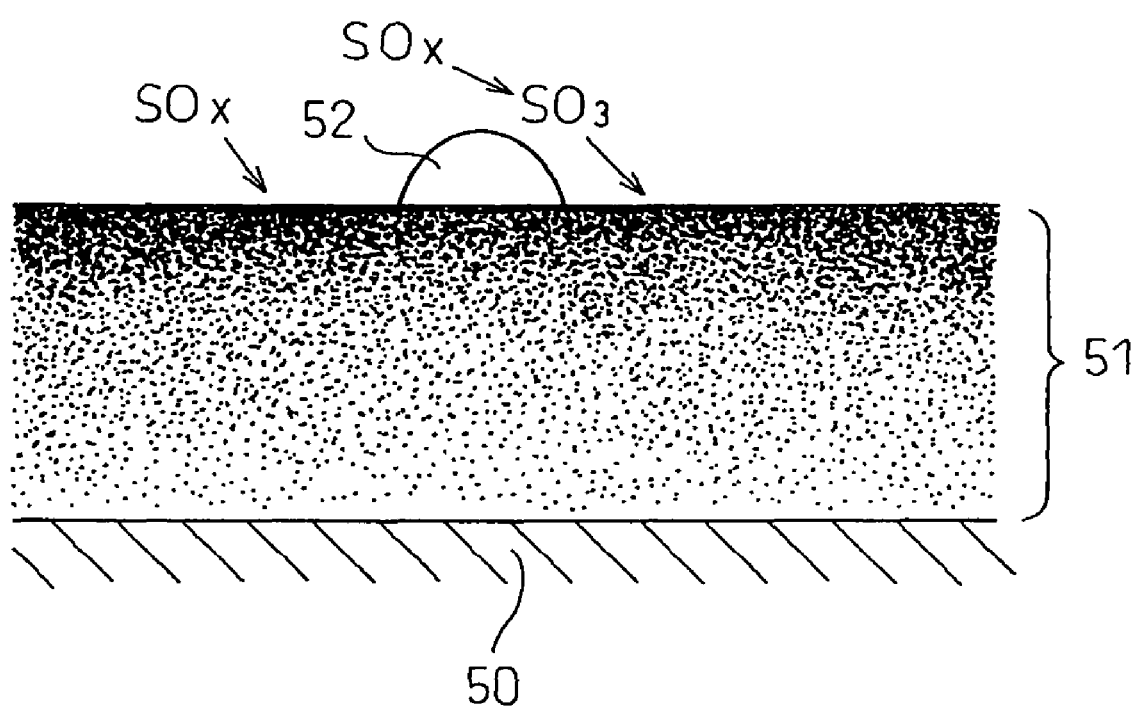
FIG. 6 is a cross-sectional view showing a surface part of a substrate of an $SO_x$ trap catalyst.

An $SO_x$ trap catalyst able to trap the $SO_x$ contained in the exhaust gas can be used as the front end catalyst 12. FIG. 6 schematically shows the cross-section of the surface part of the substrate 50 of this $SO_x$ trap catalyst. As shown in FIG. 6, the substrate 50 is formed with a coated layer 51 on its surface. Further, the coated layer 51 carries a precious metal catalyst 52 diffused on its surface.

In this $SO_x$ trap catalyst, platinum Pt is used as the precious metal catalyst 52. As the ingredient forming the coated layer 51, for example, at least one element selected from potassium K, sodium Na, cesium Cs, or another alkali metal, barium Ba, calcium Ca, or another alkali earth, lanthanum La, yttrium Y, or another rare earth may be used. That is, the coated layer 51 of the $SO_x$ trap catalyst exhibits a strong basicity.

Therefore, the $SO_x$ contained in the exhaust gas, that is, the $SO_2$ is oxidized at the platinum 52 as shown in FIG. 6, then is trapped in the coated layer 51. That is, the $SO_2$ diffuses in the coated layer 51 in the form of sulfate ions $SO_4^{2-}$ to form a sulfate. Note that as explained above, the coated layer 51 exhibits a strong basicity. Therefore, part of the $SO_2$ contained in the exhaust gas is directly trapped in the coated layer 51 as shown in FIG. 6.

The concentration in the coated layer 51 in FIG. 6 shows the concentration of trapped $SO_x$. As will be understood from FIG. 6, the concentration of $SO_x$ in the coated layer 51 is highest near the surface of the coated layer 51 and gradually becomes lower the further deeper. If the $SO_x$ concentration near the surface of the coated layer 51 becomes high, the basicity of the surface of the coated layer 51 becomes weaker and the $SO_x$ trap capability becomes weaker. In this $SO_x$ trap catalyst, at this time, if the temperature of the $SO_x$ trap catalyst is raised under a lean air-fuel ratio of the exhaust gas, the $SO_x$ trap rate is restored.

That is, if raising the temperature of the $SO_x$ trap catalyst under a lean air-fuel ratio of the exhaust gas, the $SO_x$ concentrated near the surface of the coated layer 51 diffuses toward the deep part of the coated layer 51 so that the $SO_x$ concentration in the coated layer 51 becomes even. That is, the sulfate produced in the coated layer 51 changes from an unstable state concentrated near the surface of the coated layer 51 to a stable state evenly diffused across the entirety of the inside of the coated layer 51. If the $SO_x$ present near the surface of the coated layer 51 diffuses toward the deep part of the coated layer 51, the concentration of $SO_x$ near the surface of the coated layer 51 will fall. Therefore, if the temperature of the $SO_x$ trap catalyst is raised, the $SO_x$ trap rate will be restored.

Accordingly, when this $SO_x$ trap catalyst is used, the temperature of the $SO_x$ trap catalyst is periodically raised. However, when a large amount of $SO_x$ is sent to the $SO_x$ trap catalyst, even if the temperature of the $SO_x$ trap catalyst is raised, the $SO_x$ trap rate cannot be restored. Therefore, also when the $SO_x$ trap catalyst is used, it is required to perform the $SO_x$ poisoning recovery proceeding such that the temperature of the $SO_x$ trap catalyst is raised to the $SO_x$ release temperature and the air-fuel ratio of the exhaust gas flowing into the $SO_x$ trap catalyst is made rich.

LIST OF REFERENCE NUMERALS

4... intake manifold
5... exhaust manifold
7... exhaust turbocharger
12... front end catalyst
14... rear end catalyst
15, 16... reducing agent supply valve
18... $NO_x$ sensor

The invention claimed is:

1. An exhaust purification device of an internal combustion engine comprising:
   a front end catalyst and rear end catalyst arranged sequentially in an engine exhaust passage along an exhaust gas flow path, the front end catalyst and the rear end catalyst are comprised of $NO_x$ storing catalysts storing $NO_x$ contained in the exhaust gas when an air-fuel ratio of inflowing exhaust gas is lean and releasing stored $NO_x$ when the air-fuel ratio of the inflowing exhaust gas becomes stoichiometric or rich; and
   a controller, wherein
      when the front end catalyst should recover from $SO_x$ poisoning, the controller is configured to perform $SO_x$ poisoning recovery proceeding by raising a temperature of the front end catalyst to a $SO_x$ release temperature and making the air-fuel ratio of the exhaust gas flowing into the front end catalyst rich,
      when the rear end catalyst should recover from $SO_x$ poisoning, the controller is configured to perform $SO_x$ poisoning recovery proceeding by raising a temperature of the rear end catalyst to the $SO_x$ release temperature and making the air-fuel ratio of the exhaust gas flowing into the rear end catalyst rich, and
      a frequency of performing the $SO_x$ poisoning recovery proceeding for the rear end catalyst is made higher than a frequency of performing the $SO_x$ poisoning recovery proceeding for the front end catalyst, wherein
         when a $NO_x$ purification rate by both the catalysts of the front end catalyst and the rear end catalyst becomes a predetermined allowable level or less, either the $SO_x$ poisoning recovery proceeding of the front end catalyst or the $SO_x$ poisoning recovery proceeding of the rear end catalyst is performed.

2. An exhaust purification device of an internal combustion engine as claimed in claim 1, further comprising:
   a reducing agent supply valve for the front end catalyst arranged in the engine exhaust passage upstream of the front end catalyst; and a reducing agent supply valve for the rear end catalyst arranged between the front end catalyst and the rear end catalyst, wherein when performing the $SO_x$ poisoning recovery proceeding of the front end catalyst, a reducing agent is supplied from the reducing agent supply valve for the front end catalyst, and when performing the $SO_x$ poisoning recovery proceeding of the rear end catalyst, a reducing agent is supplied from the reducing agent supply valve for the rear end catalyst.

3. An exhaust purification device of an internal combustion engine as claimed in claim 1, further comprising:

an $NO_x$ sensor arranged in the engine exhaust passage downstream of the rear end catalyst, and the $NO_x$ purification rate is calculated from an $NO_x$ concentration detected by said $NO_x$ sensor.

4. An exhaust purification device of an internal combustion engine as claimed in claim 1, wherein as long as the $NO_x$ purification rate can be recovered to a target $NO_x$ purification rate, the $SO_x$ poisoning recovery proceeding of the rear end catalyst is repeated, while when the $NO_x$ purification rate cannot be recovered to the target $NO_x$ purification rate even with the $SO_x$ poisoning recovery proceeding of the rear end catalyst, the $SO_x$ poisoning recovery proceeding of the front end catalyst is performed.

5. An exhaust purification device of an internal combustion engine as claimed in claim 1, wherein as long as the $NO_x$ purification rate can be recovered to a target $NO_x$ purification rate, the $SO_x$ poisoning recovery proceeding of the rear end catalyst is repeated, while when an interval for the $SO_x$ poisoning recovery proceeding of the rear end catalyst becomes shorter than a predetermined period, the $SO_x$ poisoning recovery proceeding of the front end catalyst is performed.

6. An exhaust purification device of an internal combustion engine as claimed in claim 1, wherein said front end catalyst is comprised of a $SO_x$ trap catalyst, and the $SO_x$ trap catalyst has a property that when the air-fuel ratio of the exhaust gas flowing into the $SO_x$ trap catalyst is lean, the $SO_x$ trap catalyst traps $SO_x$ contained in the exhaust gas and trapped $SO_x$ gradually diffuses inside the $SO_x$ trap catalyst when a temperature of the $SO_x$ trap catalyst rises under a lean air-fuel ratio of the exhaust gas and has a property that when the air-fuel ratio of the exhaust gas flowing into the $SO_x$ trap catalyst becomes rich, the $SO_x$ trap catalyst releases the trapped $SO_x$ if the temperature of the $SO_x$ trap catalyst is more than an $SO_x$ release temperature.

\* \* \* \* \*